Sept. 26, 1967 K. C. BRADFORD 3,343,336
PACKAGING MACHINE
Filed June 30, 1964 5 Sheets-Sheet 1
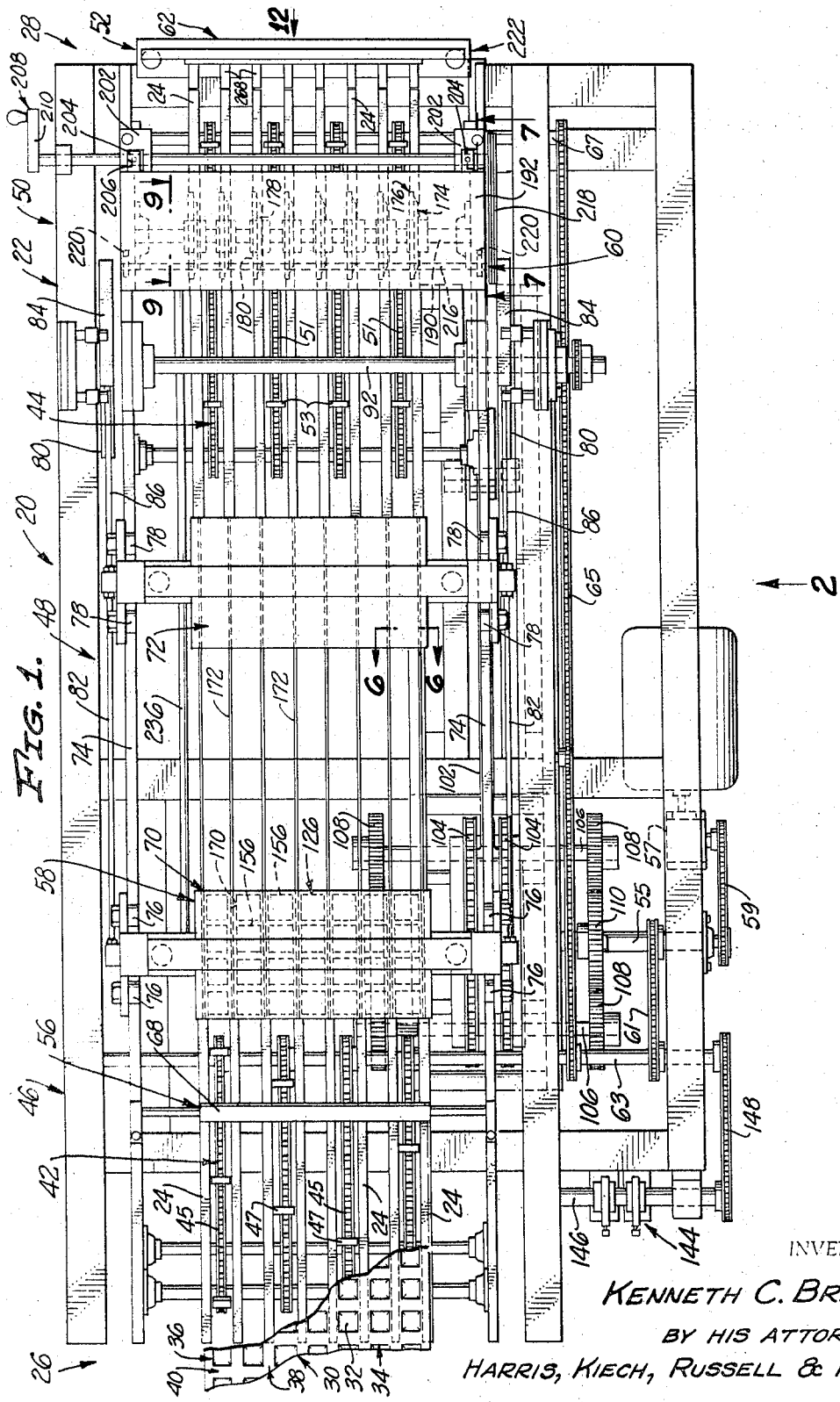
INVENTOR.
KENNETH C. BRADFORD
BY HIS ATTORNEYS
HARRIS, KIECH, RUSSELL & KERN

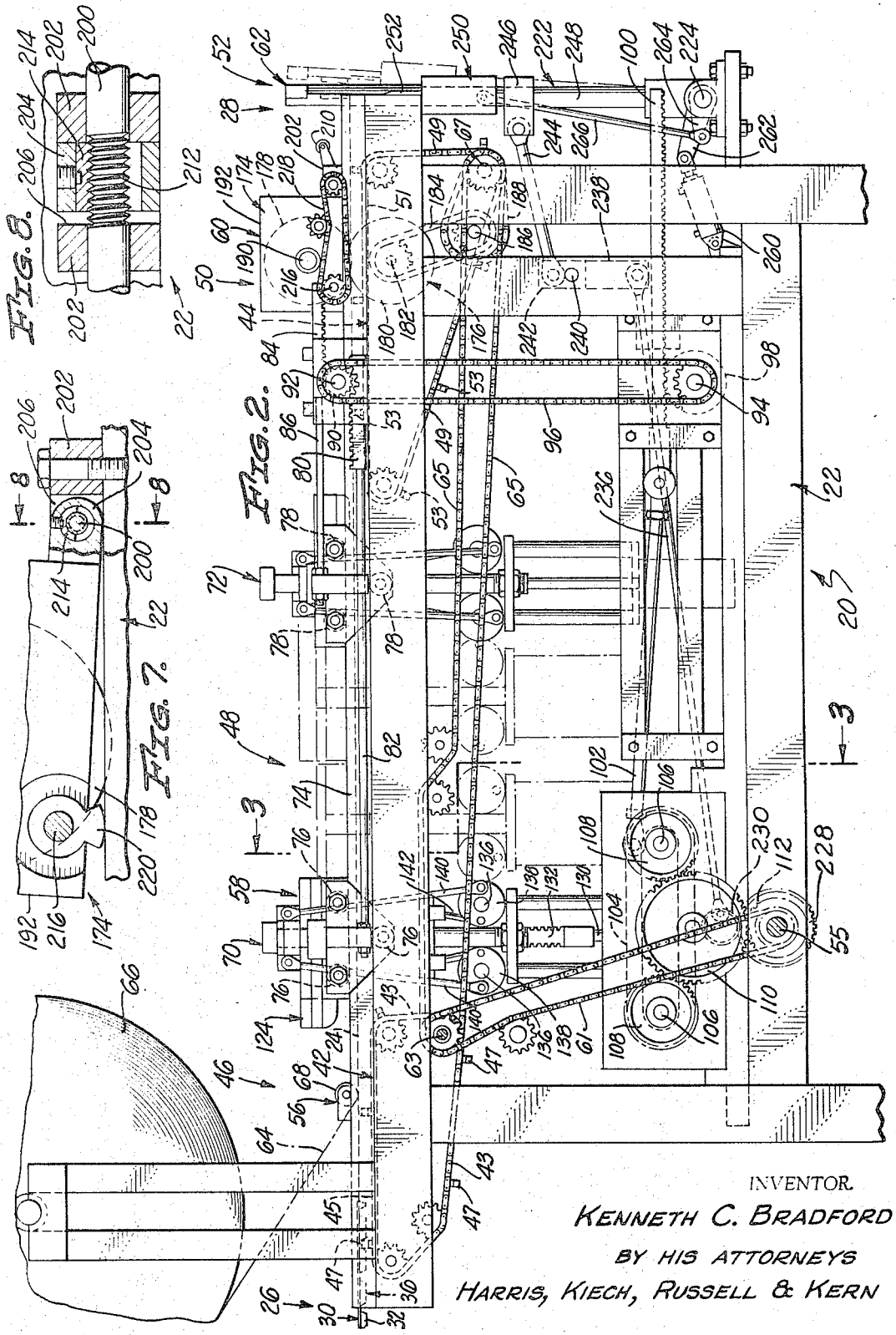

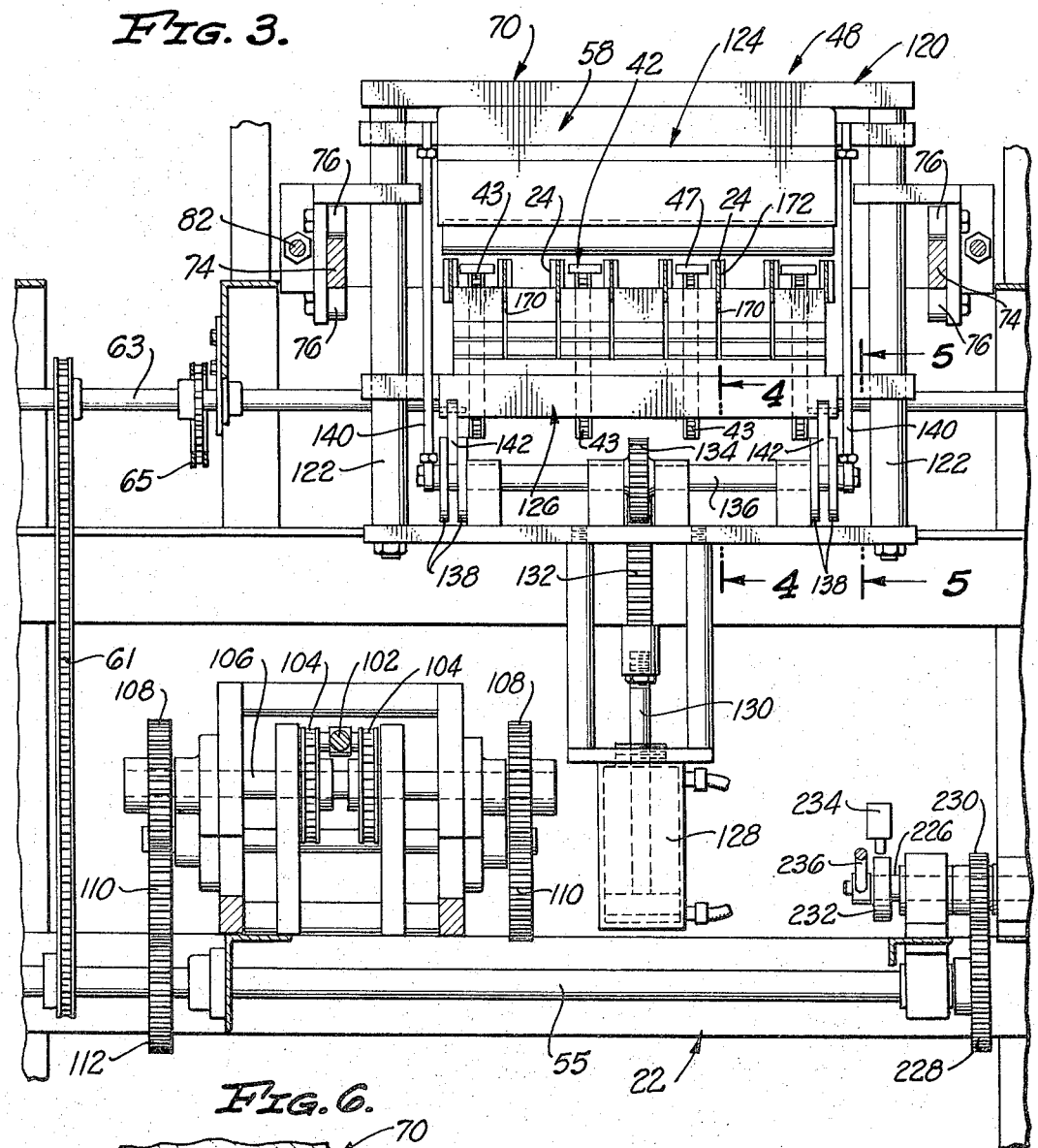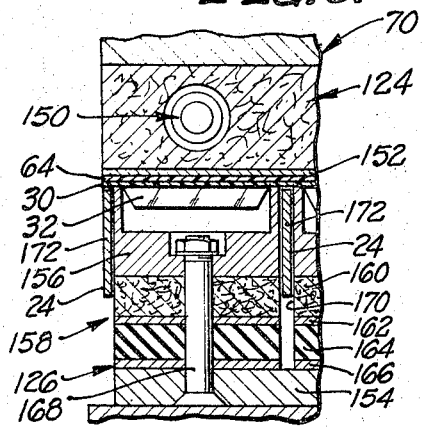

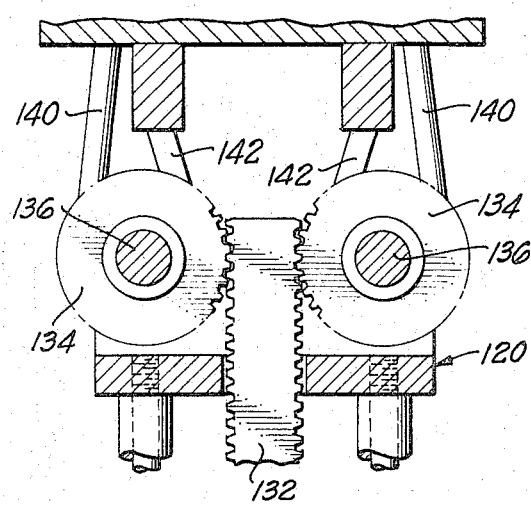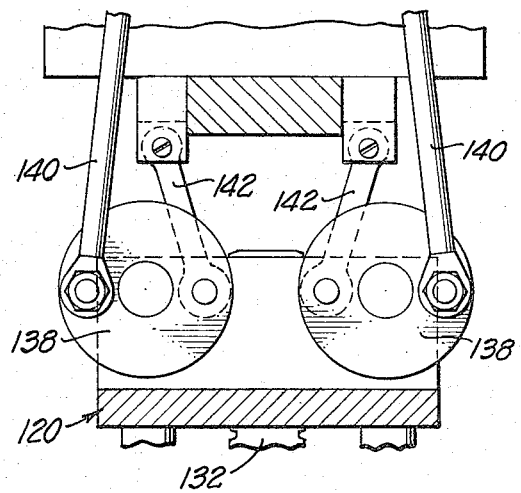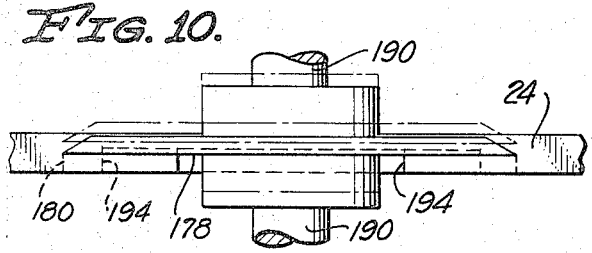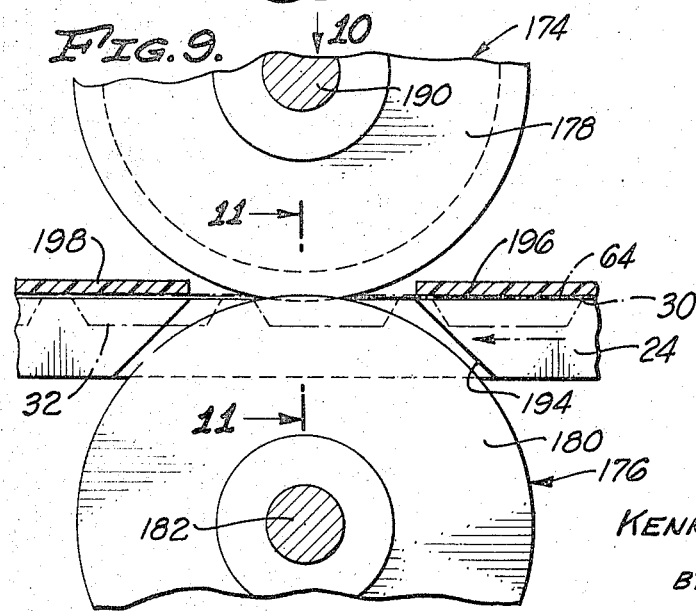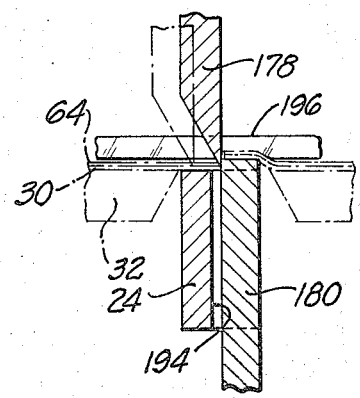

INVENTOR.
KENNETH C. BRADFORD
BY HIS ATTORNEYS
HARRIS, KIECH, RUSSELL & KERN

United States Patent Office 3,343,336
Patented Sept. 26, 1967

3,343,336
PACKAGING MACHINE
Kenneth C. Bradford, Anaheim, Calif., assignor to Sta-Hi Corporation, Whittier, Calif., a corporation of California
Filed June 30, 1964, Ser. No. 379,250
7 Claims. (Cl. 53—329)

The present invention relates in general to an apparatus for making individual hermetically-sealed packages from a compartmented sheet provided therein with depending compartments which are arranged in transversely-spaced longitudinal rows and longitudinally-spaced transverse rows and which are separated by plane portions of the compartmented sheet, the compartments being closed by a superimposed covering sheet bonded to the plane portions of the compartmented sheet, preferably by heat sealing.

The primary object of the invention is to provide a fully automatic machine which covers the compartments in the compartmented sheet, and their contents, by superimposing the covering sheet on the compartmented sheet, which hermetically seals the compartments by heat sealing the covering sheet to the compartmented sheet around the compartments in the latter, which longitudinally shears the heat sealed sheets into longitudinal strips along longitudinal lines between the longitudinal rows of compartments, and which transversely shears the longitudinal strips into individual packages along transverse lines between the transverse rows of compartments, all while the compartmented sheet is moving continuously, at a constant speed, from the inlet end of the machine to the outlet end thereof through a covering station, a heat sealing station, a longitudinal shearing station and a transverse shearing station. More particularly, the primary object of the invention is to provide covering means, heat sealing means, longitudinal shearing means and transverse shearing means, respectively located in the correspondingly-named stations mentioned, for respectively carrying out the correspondingly-entitled functions while the compartmented sheet, and the superimposed covering sheet, move continuously through the machine at a constant speed.

Another object of the invention is to support the compartmented sheet on transversely-spaced longitudinal rails which are engaged by longitudinal plane strips of the compartmented sheet and which receive the longitudinal rows of compartments therebetween, and to propel the compartmented sheet through the machine by means of propelling elements insertable between transverse rows of compartments and carried by longitudinally-oriented endless chains between the rails. A related object is to provide such propelling means adjacent the inlet and outlet ends of the machine only, omitting them in the heat sealing station, and making the rails laterally thin in such station, to permit access to the under side of the compartmented sheet by the heat sealing means.

An important object of the invention is to provide a heat sealing means which includes upstream and downstream heat sealing units alternately movable into heat sealing engagement with the superimposed compartmented and covering sheets and respectively capable of heat sealing alternate transverse sections of the superimposed sheets.

Another important object of the invention is to provide actuating means for the heat sealing units which moves one of the units in the downstream direction and simultaneously moves the other in the upstream direction, the downstream-moving unit being in heat sealing engagement with the superimposed sheets and the upstream-moving unit being disengaged from the sheets.

Another important object is to alternately move the upstream and downstream heat sealing units alternately in the upstream and downstream directions at the speed of movement of the superimposed sheets in the downstream direction. Moving each heat sealing unit in the downstream direction at the speed of movement of the superimposed sheets prevents any relative movement between the superimposed sheets and the unit in heat sealing engagement therewith. Moving each heat sealing unit in the upstream direction at the speed of movement of the superimposed sheets in the downstream direction avoids any necessity for providing different driving means for producing the upstream and downstream movements of the heat sealing units.

Another important advantage of utilizing two alternately operable heat sealing units in the foregoing manner is that it is unnecessary to return either unit to its upstream starting position at high speed, it being possible with the invention to return same to its upstream starting position at the speed of downstream movement of the superimposed sheets while the other unit is in operation. This avoids any necessity for a driving means providing a quick return motion, which is an important feature.

Still another object of the invention is to provide an actuating means for moving the two heat sealing units in the upstream and downstream directions which includes two spaced sprockets, an endless chain trained around the sprockets and having two straight runs therebetween, and means interconnecting the endless chain and the heat sealing units. With this construction, the two straight runs of the endless chain are utilized to move each heat sealing unit in the upstream and downstream directions alternately at the same and constant speeds. (Of course, this construction provides variable-speed "dwells" at the ends of the strokes of the two sealing units, but these may be minimized by utilizing sprockets having diameters as small as practicable.)

Each of the two heat sealing units includes upper and lower platens which are movable toward and away from each other and respectively into and out of engagement with the covering and compartmented sheets, the invention providing clamping means for moving the two platens into and out of heat sealing, clamping engagement with the superimposed sheets. An important object in this connection is to provide the clamping means with crank means for moving the two platens of each heat sealing unit into clamping engagement with the superimposed sheets with a slow final movement to eliminate any possibility of damage to the sheets.

An important object is to provide a construction for each lower platen which insures uniform engagement with the under side of the compartmented sheet around each compartment therein, and which at the same time provides space for the laterally-thin rail portions extending through the heat sealing station. More particularly, an object is to provide a lower-platen construction which includes a base and cups arranged in transversely-spaced longitudinal rows and longitudinally-spaced transverse rows and respectively adapted to receive compartments of the compartmented sheet therein, and which includes interconnecting means between the cups and the base comprising individual elastomeric elements respectively interposed between the cups and the base. With this construction, the cups are individually elastomerically mounted to insure uniform engagement of the entire periphery of each with the under side of the compartmented sheet around a corresponding compartment, thereby insuring a uniform heat seal all the way around such compartment. Also, arranging the cups in rows in the manner indicated provides space between the longitudinal rows of cups for the laterally-thin rail portions in the heat sealing station.

The invention contemplates a longitudinal shearing means, for shearing the heat sealed sheets into longitudinal strips along lines between the longitudinal rows of compartments, which comprises two sets of rotary shearing elements respectively rotatable about parallel axes on opposite sides of the path of the sheets. An important object is to so mount one of the sets of rotary shearing elements that it can be moved bodily away from the other set, in a direction perpendicular to the axes of the sets, to permit access to the heat sealed sheets. Another important object in this connection is to provide means for bodily moving one set of rotary shearing elements out of coacting relation with the other set, in a direction parallel to the axes of the two sets, to prevent engagement of and possible damage to the two sets of rotary shearing elements upon relative movement of the two sets toward each other in a direction perpendicular to such axes.

A further object of the invention is to so locate the sets of rotary shearing elements relative to the supporting rails for the sheets that they shear the heat sealed sheets along the longitudinal centerlines of the corresponding rails, and thus along the longitudinal centerlines of the plane longitudinal strips of the compartmented sheet.

Another object of the invention is to provide a transverse shearing means, for transversely shearing the longitudinal strips emanating from the longitudinal shearing station into individual packages along transverse lines between the transverse rows of compartments, which is movable longitudinally of the machine in synchronism with the longitudinal strips as it performs its transverse shearing function, being subsequently returned upstream to its initial position.

The foregoing objects, advantages, features and results of the present invention, together with various other objects, advantages, features and results thereof which will be evident to those skilled in the packaging art in the light of this disclosure, may be achieved with the exemplary embodiment of the invention described in detail hereinafter and illustrated in the accompanying drawings, in which:

FIG. 1 is a plan view of a packaging machine which embodies the invention;

FIG. 2 is a side elevational view of the machine, taken as indicated by the arrow 2 of FIG. 1;

FIG. 3 is an enlarged, fragmentary sectional view taken as indicated by the arrowed line 3—3 of FIG. 2;

Figure 12:
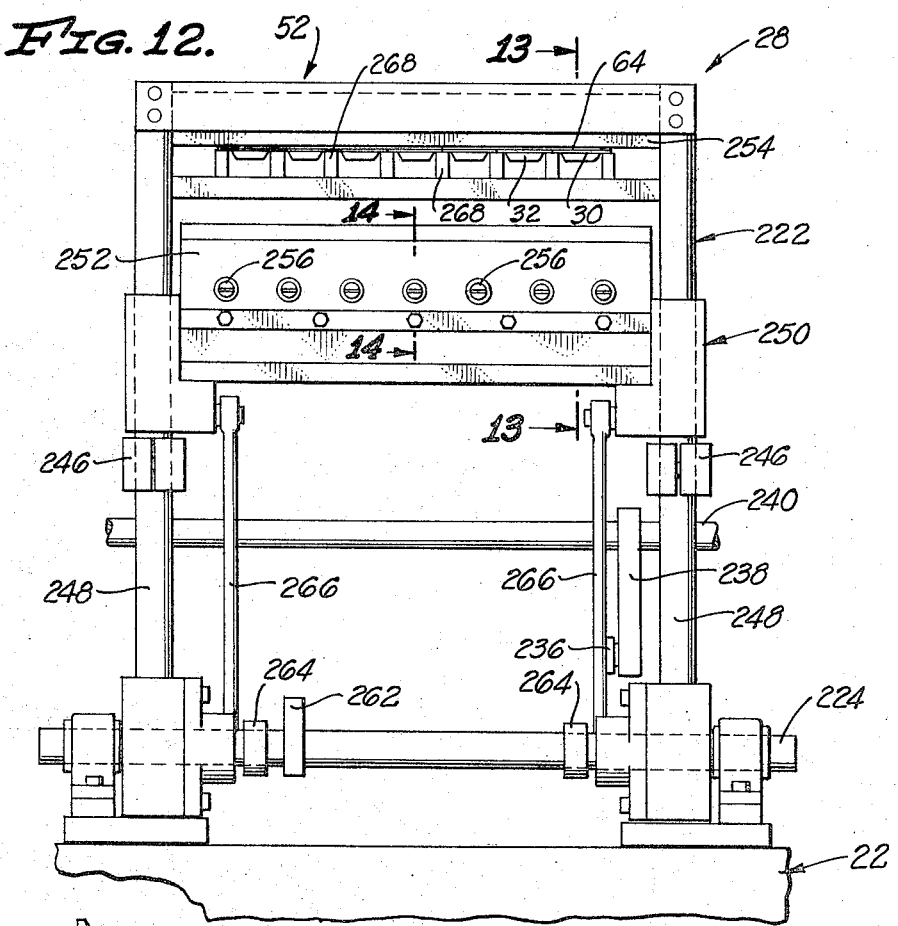
Figures 13, 14:
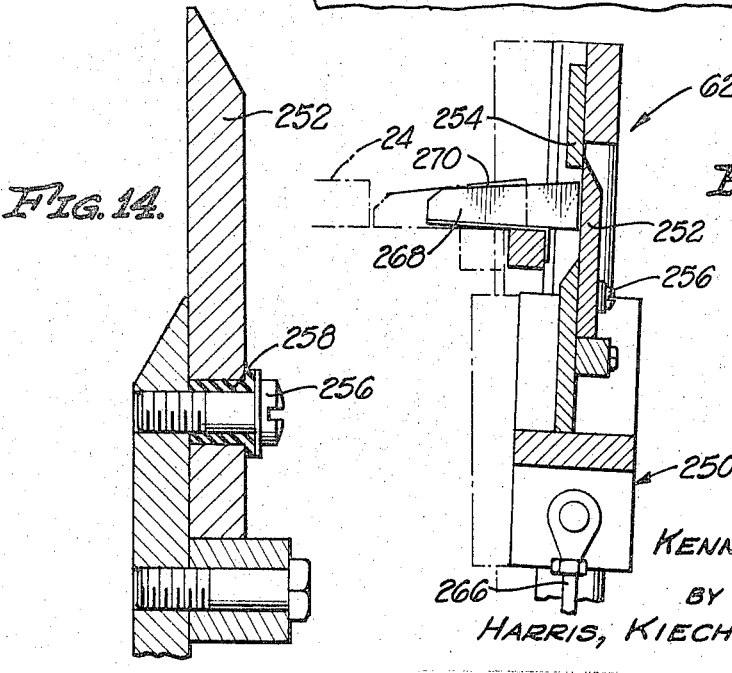

FIGS. 4 and 5 are enlarged, fragmentary sectional views respectively taken along the arrowed lines 4—4 and 5—5 of FIG. 3;

FIG. 6 is an enlarged, fragmentary sectional view taken as indicated by the arrowed line 6—6 of FIG. 1;

FIG. 7 is an enlarged, fragmentary sectional view taken as indicated by the arrowed line 7—7 of FIG. 1;

FIG. 8 is an enlarged, fragmentary sectional view taken along the arrowed line 8—8 of FIG. 7;

FIG. 9 is an enlarged, fragmentary sectional view taken as indicated by the arrowed line 9—9 of FIG. 1;

FIG. 10 is a fragmentary elevational view taken as indicated by the arrow 10 of FIG. 9;

FIG. 11 is an enlarged, fragmentary sectional view taken as indicated by the arrowed line 11—11 of FIG. 9;

FIG. 12 is an end elevational view showing the outlet end of the machine, as indicated by the arrow 12 of FIG. 1;

FIG. 13 is an enlarged, fragmentary sectional view taken as indicated by the arrowed line 13—13 of FIG. 12; and FIG. 14 is a further enlarged, fragmentary sectional view taken as indicated by the arrowed line 14—14 of FIG. 12.

*Packaging machine 20 generally*

Referring particularly to FIGS. 1 and 2 of the drawings, the packaging machine of the invention is designated generally by the numeral 20 and includes a supporting structure shown as comprising a frame 22 having what may best be described as a table-like configuration. Suitably mounted on the frame 22 are transversely-spaced longitudinal rails 24 extending from the inlet end 26 of the machine 20 to the outlet end 28 thereof. These rails support a continuous compartmented sheet 30 having formed therein depending compartments 32 arranged in transversely-spaced longitudinal rows 34 and longitudinally-spaced transverse rows 36. The depending compartments 32 are surrounded by plane portions of the compartmented sheet 30, which plane portions may be regarded as including transversely-spaced longitudinal strips 38 (two of which extend along and form the longitudinal edges of the compartmented sheet) and longitudinally-spaced transverse strips 40. The compartmented sheet 30 is placed on the rails 24 with the longitudinal rows 34 of compartments 32 disposed between the rails and with the longitudinal plane strips 38 resting on the rails.

The compartmented sheet 30 is propelled longitudinally along the rails 24, from the inlet end 26 to the outlet end 28 of the machine 20, at a constant speed by longitudinally spaced, upstream and downstream propelling means 42 and 44. In negotiating the length of the machine 20, the compartmented sheet 30 passes through a covering station 46, a heat sealing station 48 located downstream from the covering station and between the upstream and downstream propelling means 42 and 44, a longitudinal shearing station 50 located downstream from the heat sealing station, and a transverse shearing station 52 located downstream from the longitudinal shearing station and at the outlet end 28 of the machine. Covering means 56, heat sealing means 58, longitudinal shearing means 60 and transverse shearing means 62 are carried by the frame 22 in the respective correspondingly-named stations 46, 48, 50 and 52.

The compartments 32 in the sheet 30 are filled with the articles to be packaged, which articles may be individual servings or pats of butter, for example, prior to entering the packaging machine 20 at its inlet end 26. Any suitable equipment, not shown, for introducing the articles to be packaged into the compartments 32 may be used.

*Propelling means 42 and 44*

The upstream propelling means 42 extends downstream from a point adjacent the inlet end 26 of the packaging machine 20 through the covering station 46, and includes a plurality of endless chains 43 having longitudinal runs 45 between certain of the rails 24. The endless chains 43 carry propelling elements in the form of lugs 47 each of which is insertable between two adjacent compartments 32 in a corresponding longitudinal row 34 of compartments. The longitudinal upper runs 45 of the chains 43 are driven in the downstream direction so that the lugs 47 propel the compartmented sheet 30 in such direction.

The downstream propelling means 44 extends through the longitudinal shearing station 50 substantially to the outlet end 28 of the packaging machine 20, and includes similar endless chains 49 having longitudinal runs 51 between certain of the rails 24 and having propelling lugs 53 mounted thereon. The endless chains 49 and their propelling lugs 53 operate to propel the compartmented sheet 30 in the downstream direction in the same manner as the endless chains 43 and their propelling lugs 47.

Considering the manner in which the endless chains 43 and 49 are driven, the packaging machine 20 includes a main power source in the form of an electric motor 54, shown in FIG. 1 of the drawings. The motor 54 drives a main power shaft 55 through a speed reduction unit 57 and an endless chain 59 trained around suitable sprockets. As best shown in FIG. 2, the main power shaft 55 is connected by an endless chain 61, trained around suitable sprockets, to a shaft 63 which drives all of the endless chains 43 through suitable sprockets. The shaft 63 is connected, by an endless chain 65 and suitable sprockets, to a shaft 67 which drives the endless chains 49 through appropriate sprockets. Thus, the endless chains 43 and 49 of the upstream and downstream propelling means 42 and 44 are synchronized.

*Covering means 56*

At the covering station 46, the compartments 32 in the sheet 30 are closed by superimposing on the sheet 30 a flat covering sheet 64. The latter may be obtained from a supply roll 66 mounted on the frame 22 above the inlet end 26 of the machine 20, and passes under an idler roll 68 which superimposes it on the compartmented sheet. The compartmented and covering sheets 30 and 64 are heat sealable together, being heat sealed together around the compartment 32 in the compartmented sheet by the heat sealing means 58 to hermetically seal the contents of each compartment therein. The heat sealing means 58 will now be considered in detail.

*Heat sealing means 58*

The heat sealing means 58 includes upstream and downstream heat sealing units 70 and 72 which heat seal together alternate longitudinally spaced, transversely extending sections of the compartmented and covering sheets 30 and 64. Each of the heat sealing units 70 and 72 is alternately in heat sealing engagement with and disengaged from the sheets 30 and 64, and is moved in the downstream direction, i.e., toward the outlet end 28 of the packaging machine 20, at the speed of downstream movement of the sheets 30 and 64 when it is in heat sealing engagement therewith. Conversely, when each of the heat sealing units 70 and 72 is disengaged from the sheets 30 and 64, it is returned to its upstream starting position. The return movement of each heat sealing unit is also carried out at the speed of downstream movement of the sheets 30 and 64, this being permitted by the use of two heat sealing units respectively sealing alternate longiutdinally-spaced, transversely extending sections of the sheets. Thus, no high speed return movement is necessary, which is an important feature.

It might be pointed out that while one of the heat sealing units 70 and 72 is being moved in the downstream direction in heat sealing engagement with the sheets 30 and 64, the other is being moved in the upstream direction and is out of heat sealing engagement with the sheets. Thus, the two heat sealing units 70 and 72 constantly move toward and away from each other in the longitudinal direction. In FIG. 2 of the drawings, the upstream heat sealing unit 70 is shown out of heat sealing engagement with the sheets 30 and 64 and is shown substantially at the upstream end of its travel. Conversely, the downstream heat sealing unit 72 is shown in heat sealing engagement with the sheets 30 and 64 and is shown substantially at the downstream end of its stroke.

Turning now to a consideration of the manner in which the upstream and downstream sealing units 70 and 72 are reciprocated toward and away from each other at constant speeds equal to the speed of downstream movement of the compartmented and covering sheets 30 and 64 being heat sealed together, these units are mounted for movement longitudinally of the packaging machine 20 on transversely-spaced longitudinal rails 74, FIG. 3, by means of rollers 76 and 78, respectively. As shown in FIGS. 1 and 2, the upstream heat sealing unit 70 has transversely spaced, longitudinally extending racks 80 connected thereto by rods 82, and the downstream heat sealing unit 72 has transversely spaced, longitudinally extending racks 84 connected thereto by rods 86. The racks 80 and 84 on each side of the packaging machine 20 are meshed with a common pinion 90, the two pinions being mounted on a common transverse shaft 92 which, as best shown in FIG. 2, is connected to a shaft 94 by an endless chain 96 trained around suitable sprockets on the two shafts. The shaft 94 carries a pinion 98 having meshed therewith a longitudinally extending rack 100. Pivotally secured to one end of the rack 100 is one end of a connecting rod 102 the other end of which is disposed betweeen and pivotally connected to longitudinally-extending endless chains 104, as shown in FIGS. 1, 2 and 3. The chains 104 are trained around suitable sprockets on longitudinally-spaced transverse shafts 106 carrying gears 108. These gears are meshed with a common driving gear 110 which, in turn, is driven by a gear 112 on the main power shaft 55.

It will be noted that the longitudinal spacing of the shafts 106 carrying the sprockets for the chains 104 provides these chains with straight, parallel, longitudinal runs extending in the same direction as the rack 100. Thus, the chains 104 reciprocate the rack 100 at the same and constant speeds in both directions (except for short variable-speed "dwells" at the ends of the strokes of the rack 100, which "dwells" may be minimized by making the sprockets for the chains 104 as small as practicable). This constant speed movement of the rack 100 in both directions is transmitted to the two heat sealing units 70 and 72 through the pinion 98, the chain 96, the pinions 90 and the racks 80 and 84. Thus, the two heat sealing units 70 and 72 are moved at the same and constant speeds in both the upstream and downstream directions, except for short variable-speed "dwells" at the ends of the strokes of the heat sealing units. The operation of the heat sealing units 70 and 72 is so timed that the units are out of heat sealing engagement with the compartmented and covering sheets 30 and 64 during such "dwells," as well as during upstream movement of each unit. Thus, each heat sealing unit 70 or 72 is in heat sealing engagement with the sheets 30 and 64 only while such unit is moving in the downstream direction at a constant speed, which constant speed is the same as the constant downstream speed of the sheets being heat sealed.

It will be noted that the endless chains 104, and the intervening connections between these endless chains and the heat sealing units 70 and 72, provide a very simple way of reciprocating the heat sealing units longitudinally at constant speeds (except for the short variable-speed "dwells" at the ends of the strokes of these units), which is an important feature of the invention.

*Heat sealing units 70 and 72*

The heat sealing units 70 and 72 are identical so that only the unit 70 will be considered in detail. Referring to FIG. 3 of the drawings, the heat sealing unit 70 includes a frame 120 which is mounted on the rails 74 for movement longitudinally of the packaging machine 20 by means of the aforementioned rollers 76. The frame 120 includes upright guides 122 for upper and lower heat sealing platens 124 and 126 which are movable toward and away from each other into and out of heat sealing engagement with the covering and compartmented sheets 64 and 30, respectively. The structures of these platens will be considered hereinafter.

Considering first the manner in which the platens 124 and 126 are moved toward and away from each other, mounted on and depending from the frame 120 is a fluid motor, preferably an air motor, of the cylinder and piston type. The motor 128 includes an upwardly extending piston rod 130 connected at its upper end to the lower end of an upwardly extending rack 132 meshed with pinions 134 on opposite sides thereof. As best shown in FIG. 4, the pinions 134 are connected to and drive transversely extending, longitudinally spaced shafts 136 mounted on the frame 120 and having discs 138 at their ends.

As shown in FIGS. 2, 3 and 5 of the drawings, eccentrically and pivotally connected to the discs 138 are relatively long connecting rods 140 which are pivotally connected at their upper ends to the upper platen 124. Relatively short connected rods 142 are eccentrically and pivotally connected to the discs 138 at their lower ends and are pivotally connected to the lower platen 126 at their upper ends. The pivotal connections of the rods 142 to the discs 138 are diametrically opposite the pivotal connections of the rods 140 thereto.

As will be apparent, the eccentric connections of the rods 140 and 142 to the discs 138 provide crank means for moving the upper and lower platens 124 and 126 vertically along the guides 122. Since the crank means for the upper and lower platens 124 and 126 are diametrically opposed, the two platens 124 and 126 move toward each other in response to movement of the rack 132 in one direction, and move away from each other in response to movement of the rack in the opposite direction. More particularly, the gear ratio between the rack 132 and the pinions 134, and the throws of the crank means connecting the shafts 136 to the upper and lower platens 124 and 126, are so selected that the upward stroke of the motor 128 causes the upper and lower platens to clamp the covering and compartmented sheets 64 and 30 therebetween in heat sealing engagement, while the downward stroke of the motor moves the two platens to their retracted or open positions, wherein they are clear of the covering and compartmented sheets. As will be clear from a comparison of the positions shown in FIG. 2 for the crank means for opening and closing the respective heat sealing units 70 and 72, the desired opening and closing movements are achieved in the particular construction illustrated by angularly displacing the crank means through approximately 90°. When the heat sealing unit 70, for example, is open, the pivotal connections of its actuating rods 140 and 142 to its discs 138 are horizontally opposed, as shown in FIGS. 2 and 5 of the drawings. When the upper and lower platens 124 and 126 are closed, and in heat sealing engagement with the covering and compartmented sheets 64 and 30, the pivotal connections of the rods 140 and 142 to the discs 138 are substantially vertically opposed.

As will be apparent, this construction provides a rapid initial closing movement of the upper and lower platens 124 and 126, terminating in a slow final closing movement as the pivotal connections of the rods 140 and 142 to the discs 138 approach substantially vertical opposition. This slow, final closing movement is an important feature of the invention since it insures entry of the upper and lower platens 124 and 126 into heat sealing engagement with the covering and compartmented sheets 64 and 30, respectively, slowly to prevent any possibility of damage to the sheets.

The motor 128 for opening and closing the heat sealing unit 70, and the corresponding motor for opening and closing the heat sealing unit 72, are actuated at the proper times in the operating cycle of the packaging machine 20 by a cam and switch assembly 144 (shown in FIG. 1 of the drawings only as a matter of convenience) which includes a cam shaft 146 driven in timed relation with the remaining components of the packaging machine by a chain 148, shown as trained around suitable sprockets on the cam shaft 146 and on the shaft 63. It will be understood that the assembly 144 closes each of the heat sealing units 70 and 72 at the upstream end of the constant-speed downstream stroke of such unit, and opens each unit at the downstream end of the constant-speed downstream stroke thereof. The conections between the cam and switch assembly 144 and the motors for opening and closing the heat sealing units which are necessary to effect this mode of operation are not shown since they can readily be supplied by one skilled in the art.

Upper and lower platens 124 and 126

In the particular construction illustrated, the upper and lower platens 124 and 126 of each heat sealing unit are respectively heated and unheated. Referring to FIG. 6 of the drawings, the heated upper platen 124 has resistance heating means 150 embedded therein adjacent the bottom thereof, the lower portion of the upper platen 124 having a plane bottom surface formed in the particular construction illustrated by a flexible cover 152. When the upper and lower platens 124 and 126 are closed, as shown in FIG. 6, the heated cover 152 is seated against the upper side of the heat sealable covering sheet 64 for the compartmented sheet 30.

The unheated lower platen 126 includes a base 154 having individually and elastomerically mounted thereon square heat sealing cups 156 which, as suggested in FIG. 1 of the drawings, are arranged in transversely-spaced longitudinal rows and longitudinally-spaced transverse rows respectively corresponding to the longitudinal and transverse rows 34 and 36 of compartments 32 in the compartmented sheet 30. As will be apparent, when the two platens 124 and 126 are in heat sealing engagement with the covering and compartmented sheets 64 and 30, respectively, each cup 156 receives one of the compartments 32 therein and engages the under side of the compartmented sheet around such compartment to cooperate with the heated upper platen 124 in heat sealing the two sheets together around such compartment.

As indicated in the preceding paragraph, each cup 156 is individually and elastomerically mounted on the base 154, this being an important feature since it permits the mouth of the cup to engage the under side of the compartmented sheet 30 with a uniform pressure all the way around a compartment being heat sealed. The individual and elastomeric mounting for each cup 156 is shown in FIG. 6 of the drawings as comprising a laminated structure 158 composed of a layer 160 of heat insulating material in engagement with the bottom of the cup, a metal spacer 162 engaging the bottom of the heat insulating layer, an elastomeric layer 164 engaging the bottom of the spacer 162, and another metal spacer 166 between the bottom of the elastomeric layer and the top of the base 154. The cup 156, the heat insulating layer 160, the spacer 162, the elastomeric layer 164 and the spacer 166 are preferably all bonded together to form an integral unit secured to the base 154 by a central bolt 168. As will be apparent, this construction permits the cup 156 to tilt slightly relative to the base 154 as required to achieve the desired uniform heat sealing pressure around the mouth of the cup.

It will be noted that the longitudinal rows in which the cups 156 of the lower platen 126 are arranged are spaced apart transversely to provide longitudinal grooves 170 receiving therein laterally thin portions 172 of the rails 24. These laterally thin portions of the rails 24 extend throughout the heat sealing station 48 to permit the hereinbefore-described reciprocatory motion of the two heat sealing units 70 and 72.

Longitudinal shearing means 60

Referring to FIGS. 1 and 2 of the drawings, the longitudinal shearing means 60 includes upper and lower longitudinal shearing units 174 and 176 respectively comprising coacting rotary shearing elements 178 and 180 for shearing the heat-sealed sheets 30 and 64 substantially on the longitudinal centerlines of the intermediate plane longitudinal strips 38 of the compartmented sheet 30, and substantially on the longitudinal centerlines of the rails 24. The lower shearing elements 180 are driven elements fixed on a transverse shaft 182 which is rotatably mounted on the frame 22 and which is driven by an endless chain 184 trained around sprockets on the shaft 182 and on a shaft 186 on the frame 22. The shaft 186 is driven by an endless chain 188 trained around suitable sprockets on the shaft 186 and the shaft 67. The upper shearing elements 178 are idler elements carried by a shaft 190 rotatably mounted in a housing 192. The lower shearing elements 180 are shown as cylindrical discs, while the upper shearing elements 178 coacting therewith are shown as having beveled edges.

As shown in FIGS. 9 to 11 of the drawings, each rail 24 is provided in the longitudinal shearing station 50 with a notch 194 in one side thereof to enable the corresponding upper and lower shearing elements 178 and 180 to shear along the longitudinal centerline of such rail, and thus along the longitudinal centerline of the corresponding longitudinal plane strip 38 separating adjacent longitudinal rows 34 of compartments 32 in the compartmented sheet 30, which now has the covering sheet 64 heat sealed thereto. This construction results in shearing the heat sealed sheets 30 and 64 into longitudinal package strips having flanges of equal widths extending laterally from the corresponding longitudinal rows 34 of compartments 32.

As shown in FIG. 9, guides 196 and 198 overlie the heat sealed sheets 30 and 64 upstream and downstream from the longitudinal shearing means 60 to confine the heat sealed sheets between such guides and the rails 24 while they are longitudinally sheared into strips. These guides 196 and 198 are suitably mounted on the housing 192 carrying the upper shearing elements 178 so that they are retractable upwardly when the housing 192 is retracted upwardly in a manner about to be described.

The housing 192 carrying the upper shearing elements 178 is retractable upwardly and toward the outlet end 28 of the packaging machine 20 by swinging it about the axis of a transverse shaft 200 pivotally mounted in bearing blocks 202 carried by the frame 22. The housing 192 is provided with arms 204 through which the shaft 200 extends and which project in the downstream direction into notches 206 in the bearing blocks 202. With this construction, the upper shearing unit 174 can be pivoted into a retracted position, about the axis of the shaft 200, for access to the heat sealed sheets 30 and 64, as in starting them through the longitudinal shearing means 60 when first placing the packaging machine 20 in operation.

To prevent damage to the rotary shearing elements 178 and 180 in returning the upper shearing unit 174 to its operative position, the invention provides means 208 for transversely moving the upper shearing elements 178 out of operative engagement with the lower shearing elements 180. This disengaging means 208 includes a handle 210 on the pivot shaft 200 for the housing 192, which handle may be rotated to rotate the pivot shaft 200 to cause threaded portions 212 within the notches 206 in the bearing blocks 202 to coact with threaded members 214 on the arms 204 of the housing 192 to bodily shift this housing transversely in a direction to disengage the upper shearing elements 178 from the lower shearing elements 180. Normally, the disengaging means 208 is actuated to disengage the upper shearing elements 178 from the lower shearing elements 180 prior to pivoting the upper shearing unit 174 into its retracted position. When the upper shearing unit 174 is subsequently returned to its operative position, the upper shearing elements 178 cannot strike the lower shearing elements 180 to damage the beveled shearing edges of the upper shearing elements. The transversely engaged and disengaged positions of one of the upper shearing elements 178 are shown in FIG. 11 of the drawings in solid and broken lines, respectively.

Extending transversely of the housing 192 on the opposite side thereof from the shaft 200 is a rotatable shaft 216 connected to the shaft 200 by an endless chain 218 trained around suitable sprockets. The shaft 216 carries leg-like cams 220 which, as best shown in FIG. 7, engage the frame 22 to lift the upper shearing elements 178 clear of the lower shearing elements 180 as the upper shearing elements are transversely disengaged from the lower shearing elements. Such upward camming of the upper shearing elements 178 into inoperative positions precludes the possibility of attempting to operate the packaging machine 20 with the upper and lower shearing elements 178 and 180 transversely disengaged.

*Transverse shearing means 62*

As the longitudinal package strips emanating from the longitudinal shearing means 60 reach the outlet end 28 of the packaging machine 20, they are transversely sheared into individual packages by the transverse shearing means 62. The latter operates in timed relation with the upstream and downstream propelling means 42 and 44 to shear the longitudinal package strips transversely along the centerlines of the transverse plane strips 40 of the original compartmented sheet 30. At the same time, the transverse shearing means 62 is moved in the downstream direction at the speed of downstream movement of the longitudinal package strips being transversely sheared, subsequently being returned to its initial, upstream position. The initial, upstream and final, downstream positions of the transverse shearing means 62 are shown in solid lines and broken lines, respectively, in FIG. 2 of the drawing, the final, downstream position thereof also being shown in FIG. 13.

Considering the transverse shearing means 62 in more detail, it is carried by a frame 222 which is secured to a transverse shaft 224 pivotably mounted on the main frame 22. As will be apparent from FIG. 2 of the drawings, the frame 222 carrying the transverse shearing means 62 is pivotable about the axis of the transverse shaft 224 to pivot the transverse shearing means between its initial, upstream and final, downstream positions.

Considering the means for pivoting the frame 222 in the foregoing manner, and referring initially to FIG. 3 of the drawings, the main power shaft 55 drives a parallel shaft 226 through gears 228 and 230. The shaft 226 carries a cam 232 adapted to operate a switch 234 for a purpose to be described. Eccentrically mounted on the cam 232 is one end of a connecting rod 236 the other end of which, as shown in FIG. 2 of the drawings, is pivotally connected to an arm 238 on a transverse shaft 240 pivotally mounted on the main frame 22. The shaft 240 is provided with additional arms 242, only one of which is visible in FIG. 2 of the drawings, having connecting rods 244 pivotally connected thereto. The other ends of the rods 244 are pivotally connected to blocks 246 on uprights 248 of the frame 222. For each revolution of the shaft 226, the transverse shearing means 62 is pivoted back and forth through one complete cycle, this corresponding to a downstream movement of the covering and compartmented sheets 64 and 30 equal to the longitudinal spacing of adjacent transverse rows 36 of the compartments 32.

Slidable on the uprights 248 is a crosshead 250 which carries a transverse shearing blade 252 adapted to cooperate with a stationary blade 254 carried by the frame 222, the movable blade 252 being mounted by means of screws 256 surrounded by elastomeric grommets 258, FIG. 14, for shock absorption purposes. The movable blade 252 is moved upwardly and downwardly in synchronism with the back and forth pivotal movement of the frame 222 about the axis of the shaft 224. More particularly, as the frame 222 is pivoted in the downstream direction, the movable blade 252 is moved upwardly to shear off a transverse row of individual packages. Conversely, as the frame 222 is pivoted in the upstream direction, the movable blade 252 is moved downwardly into its initial position. Such movement of the movable blade 252 is produced by an air cylinder 260, or other fluid motor, FIG. 2, anchored at one end to the main frame 22 and connected at its other end to an arm 262 on the shaft 224. This shaft is provided with other arms 264 having connecting rods 266 pivotally secured thereto, the other ends of these rods being pivotally connected to the crosshead 250. The air cylinder 260 is controlled by the hereinbefore-mentioned switch 234, which is operated by the cam 232 to synchronize the up and down movement of the movable blade 252 with the back and forth pivotal movement of the frame 222. This insures that the blade 252 will transversely shear the longitudinal strips emanating from the longitudinal shearing means 60, without in any way impeding the downstream progress of such longitudinal strips.

As best shown in FIG. 13 of the drawings, each of the rails 24 is provided with a short extension 268 which is mounted on the frame 222 of the transverse shearing means 62 so as to pivot therewith. When the frame 222 is in its upstream position, the upstream ends of the rail extensions 268 are adjacent the downstream ends of the rails 24, and the upper surfaces 270 of the extensions are below the upper surfaces of the rails and slope upwardly in the downstream direction. When the frame 222 is in its downstream position, the upper surfaces 270 of the rail extensions are substantially horizontal and at a level slightly below the upper surfaces of the rails 24. The downstream ends of the rail extensions 268 are located just upstream from the path of the blade 252. This construction provides full support for the extreme downstream ends of the longitudinal package strips during the operation of shearing a transverse row of packages therefrom.

Although an exemplary embodiment of the invention has been disclosed herein for purposes of illustration, it will be understood that various changes, modifications and substitutions may be incorporated in such embodiment without departing from the spirit of the invention as defined by the claims which follow:

I claim:

1. In a machine for making individual packages from a compartmented sheet provided therein with depending compartments closed by a superimposed covering sheet and arranged in transversely-spaced longitudinal rows and longitudinally-spaced transverse rows, the combination of:
   (a) a supporting structure providing longitudinally-spaced inlet and outlet ends;
   (b) transversely-spaced longitudinal rails carried by and extending between said inlet and outlet ends of said supporting structure and receiving therebetween the longitudinal rows of compartments in the compartmented sheet;
   (c) propelling means upstream and downstream from a heat sealing station for propelling the compartmented sheet, and the covering sheet superimposed thereon, longitudinally along said rails from said inlet end of said supporting structure to said outlet end thereof;
   (d) heat sealing means carried by said supporting structure in a heat sealing station downstream from said inlet end thereof for heat sealing the compartmented and covering sheets together around the compartments in the compartmented sheet;
   (e) longitudinal shearing means carried by said supporting structure in a longitudinal shearing station downstream from said heat sealing station and in the vicinity of said downstream propelling means for longitudinally shearing the heat sealed compartmented and covering sheets into longitudinal strips along longitudinal lines between the longitudinal rows of compartments in the compartmented sheet during movement thereof, said longitudinal shearing means, longitudinal rails and the downstream propelling means being arranged with respect to one another to permit severance of the compartmented sheet substantially on the longitudinal centerlines of corresponding ones of said rails; and
   (f) transverse shearing means in a transverse shearing station downstream from said longitudinal shearing station for transversely shearing the longitudinal strips emanating from said longitudinal shearing station into individual packages along transverse lines between the transverse rows of compartments, said transverse shearing means being located downstream of the outlet ends of said longitudinal rails and downstream propelling means.

2. In a machine for making individual packages from a compartmented sheet provided therein with depending compartments closed by a superimposed covering sheet and arranged in transversely-spaced longitudinal rows and longitudinally-spaced transverse rows, the combination of:
   (a) a supporting structure providing longitudinally-spaced inlet and outlet ends;
   (b) transversely-spaced longitudinal rails carried by and extending between said inlet and outlet ends of said supporting structure and receiving therebetween the longitudinal rows of compartments in the compartmented sheet;
   (c) first propelling means located between certain of said rails, and including elements insertable between adjacent tranvserse rows of compartments in the compartmented sheet, for propelling the compartmented sheet, and the covering sheet superimposed thereon, longitudinally along said rails from said inlet end of said supporting structure to said outlet end thereof;
   (d) heat sealing means carried by said supporting structure in a heat sealing station downstream from said inlet end thereof for heat sealing the compartmented and covering sheets together around the compartmented sheet, said heat sealing means being longitudinally spaced from said first propelling means and including upper and lower heat sealing units relatively movable toward each other and insertable between the transversely spaced longitudinal rails;
   (e) longitudinal shearing means carried by said supporting structure in a longitudinal shearing station downstream from said heat sealing station for longitudinally shearing the heat sealed compartmented and covering sheets into longitudinal strips along longitudinal lines between the longitudinal rows of compartments in the compartmented sheet;
   (f) transvsrse shearing means in a transverse shearing station downstream from said longitudinal shearing station for transversely shearing the longitudinal strips emanating from said longitudinal shearing station into individual packages along transverse lines between the transverse rows of compartments said transverse shearing means being located downstream of said longitudinal rails; and
   (g) second propelling means spaced downstream from said heat sealing means and upstream from the transverse shearing station, said second propelling means being associated with the longitudinal shearing means for transporting the compartmented sheet during severing thereof, said second propelling means also being located between certain of said rails and including elements insertable between adjacent transverse rows or compartments in the compartmented sheet.

3. In a machine for making individual packages from a compartmented sheet provided therein with depending compartments closed by a superimposed covering sheet and arranged in transversely-spaced longitudinal rows and longitudinally-spaced transverse rows, the combination of:
   (a) a supporting structure providing longitudinally-spaced inlet and outlet ends;
   (b) transversely-spaced longitudinally rails carried by and extending between said inlet and outlet ends of said supporting structure and receiving therebetween the longitudinal rows of compartments in the compartmented sheet;
   (c) propelling means between certain of said rails upstream and downstream from a heat sealing station, and including elements insertable between adjacent transverse rows of compartments in the compartmented sheet, for propelling the compartmented sheet, and the covering sheet superimposed thereon, longitudinally along said rails from said inlet end of said supporting structure to said outlet end thereof;
   (d) heat sealing means carried by said supporting structure in said heat sealing station for heat sealing the compartmented and covering sheets together around the compartments in the compartmented sheet;
   (e) longitudinal shearing means carried by said supporting structure in a longitudinal shearing station downstream from said heat sealing station and in the vicinity of the downstream propelling means for longitudinally shearing the heat sealed compartmented and covering sheets into longitudinal strips along longitudinal lines between the longitudinal rows of compartments in the compartmented sheet as said compartmented sheet is conveyed by said downstream propelling means; and (f) transverse shearing means in a transverse shearing station downstream from said longitudinal shearing station for transversely shearing the longitudinal strips emanating from said longitudinal shearing station into individual packages along transverse lines between the transverse rows of compartments, said transverse shearing means being located downstream from the longitudinal rails.

4. In a machine for making individual packages from a compartmented sheet provided therein with depending compartments closed by a superimposed covering sheet and arranged in transversely-spaced longitudinal rows and longitudinally-spaced transverse rows, the combination of:

(a) a supporting structure providing longitudinally-spaced inlet and outlet ends;

(b) propelling means for continuously propelling the compartmented sheet, and the covering sheet superimposed thereon, longitudinally in a downstream direction from said inlet end of said supporting structure to said outlet end thereof;

(c) heat sealing means, carried by said supporting structure in a heat sealing station downstream from said inlet end thereof, for heat sealing the sheets together around the compartments in the compartmented sheet;

(d) said heat sealing means including two heat sealing units alternately engageable with the sheets;

(e) actuating means for moving each of said units longitudinally in the downstream direction, at the speed of movement of the sheets in the downstream direction, when it is engaged with the sheets, and for moving each of said units longitudinally in the upstream direction when it is disengaged from the sheets;

(f) means operatively connected to said actuating means for moving said units into and out of engagement with the sheets alternately as said units are moved in the downstream and upstream directions respectively;

(g) longitudinal shearing means carried by said supporting structure in a longitudinal shearing station downstream from said heat sealing station for longitudinally shearing the heat sealed sheets into longitudinal strips along longitudinal lines between the longitudinal rows of compartments in the compartmented sheet; and (h) transverse shearing means in a transverse shearing station downstream from said longitudinal shearing station, and movable longitudinally in synchronism with the longitudinal strips emanating from said longitudial shearing station, for transversely shearing the strips into individual packages along transverse lines between the transverse rows of compartments.

5. In a machine for making individual packages from a compartmented sheet provided therein with depending compartments closed by a superimposed covering sheet and arranged in transveresly-spaced longitudinal rows and longitudinally-spaced transverse rows, the combination of:

(a) a supporting structure providing longitudinally-spaced inlet and outlet ends;

(b) propelling means for continuously propelling the compartmented sheet, and the covering sheet superimposed thereon, longitudinally in a downstream direction from said inlet end of said supporting structure to said outlet end thereof;

(c) heat sealing means, carried by said supporting structure in a heat sealing station downstream from said inlet end thereof, for heat sealing the sheets together around the compartments in the compartmented sheet;

(d) said heat sealing means including two heat sealing units alternately engageable with the sheets;

(e) actuating means for moving each of said units longitudinally in the downstream direction, at the speed of movement of the sheets in the downstream direction, when it is engaged with the sheets, and for moving each of said units longitudinally in the upstream direction, at the speed of movement of the sheets in the downstream direction, when it is disengaged from the sheets;

(f) said actuating means including two spaced sprockets, an endless chain trained around said sprockets, and means connecting said endless chain to said units;

(g) means operatively connected to said actuating means for moving said units into and out of engagement with the sheets alternately as said units are moved in the downstream and upstream directions respectively;

(h) longitudinal shearing means carried by said supporting structure in a longitudinal shearing station downstream from said heat sealing station for longitudinally shearing the heat sealed sheets into longitudinal strips along longitudinal lines between the longitudinal rows of compartments in the compartmented sheet; and (i) transverse shearing means in a transverse shearing station downstream from said longitudinal shearing station, and movable longitudinally in synchronism with the longitudinal strips emanating from said longitudinal shearing station, for transversely shearing the strips into individual packages along transverse lines between the transverse rows of compartments.

6. In a machine for making individual packages from a compartmented sheet provided therein with depending compartments closed by a superimposed covering sheet and arranged in transversely-spaced longitudinal rows and longitudinally-spaced transverse rows, the combination of:

(a) a supporting structure providing longitudinally-spaced inlet and outlet ends;

(b) propelling means for continuously propelling the compartmented sheet, and the covering sheet superimposed thereon, longitudinally from said inlet end of said supporting structure to said outlet end thereof;

(c) heat sealing means carried by said supporting structure in a heat sealing station downtsream from said inlet end thereof, and movable in synchronism with the sheets, for heat sealing the sheets together around the compartments in the compartmented sheet;

(d) said heat sealing means including platens disposed on opposite sides of and movable into and out of engagement with the sheets;

(e) clamping means for moving said platens into and out of engagement with the sheets, including crank means for moving said platens toward each other with a slow final movement;

(f) longitudinal shearing means carried by said supporting structure in a longitudinal shearing station downstream from said heat sealing station for longitudinally shearing the heat sealed sheets into longitudinal strips along longitudinal lines between the longitudinal rows of compartments in the compartmented sheet; and (g) transverse shearing means in a transverse shearing station downstream from said longitudinal shearing station, and movable in synchronism with the longitudinal strips emanating from said longitudinal shearing station, for transversely shearing the strips into individual packages along transverse lines between the transverse rows of compartments.

7. In a machine for making individual packages from a compartmented sheet provided therein with depending compartments closed by a superimposed covering sheet and arranged in transversely-spaced longitudinal rows and longitudinally-spaced transverse rows, the combination of:
  (a) a supporting structure providing longitudinally-spaced inlet and outlet ends;
  (b) transversely-spaced longitudinal rails carried by and extending between said inlet and outlet ends of said supporting structure and receiving therebetween the longitudinal rows of compartments in the compartmented sheet;
  (c) propelling means for propelling the compartmented sheet, and the covering sheet superimposed thereon, longitudinally along said rails from said inlet end of said supporting structure to said outlet end thereof;
  (d) heat sealing means carried by said supporting structure in a heat sealing station downstream from said inlet end thereof for heat sealing the compartmented and covering sheets together around the compartments in the compartmented sheet;
  (e) longitudinal shearing means carried by said supporting structure in a longitudinal shearing station downstream from said heat sealing station for longitudinally shearing the heat sealed compartmented and covering sheets into longitudinal strips along longitudinal lines between the longitudinal rows of compartments in the compartmented sheet;
  (f) transverse shearing means in a transverse shearing station downstream from said longitudinal shearing station for transversely shearing the longitudinal strips emanating from said longitudinal shearing station into individual packages along transverse lines between the transverse rows of compartments; and
  (g) said transverse shearing means being movable back and forth in the upstream and downstream directions and carrying extensions of said rails.

References Cited
UNITED STATES PATENTS

| | | | |
|---|---|---|---|
| 2,708,541 | 5/1955 | Jones | 53—39 X |
| 2,736,150 | 2/1956 | Loew | 53—180 X |
| 2,950,588 | 8/1960 | Gausman | 53—182 X |
| 3,041,907 | 7/1962 | Gallagher | 83—504 X |
| 3,112,590 | 12/1963 | O'Brien | 53—373 X |
| 3,131,521 | 5/1964 | Buttolph et al. | 53—180 |
| 3,242,636 | 3/1966 | Evanson et al. | 53—373 X |

TRAVIS S. McGEHEE, *Primary Examiner.*

FRANK E. BAILEY, *Examiner.*

L. S. BOUCHARD, *Assistant Examiner.*